United States Patent [19]

Gethmann et al.

[11] Patent Number: 5,332,004
[45] Date of Patent: Jul. 26, 1994

[54] ROTARY NOISE ATTENUATOR

[75] Inventors: Douglas P. Gethmann, Gladbrook; Allen C. Fagerlund; Charles R. Kuhlman, both of Marshalltown, all of Iowa; Ronnie L. Smith, Whitesboro; Alan D. Thomas, Sherman, both of Tex.; Larry J. Weber, Marshalltown, Iowa

[73] Assignee: Fisher Controls International, Inc., Del.

[21] Appl. No.: 21,493

[22] Filed: Feb. 23, 1993

Related U.S. Application Data

[63] Continuation-in-part of Ser. No. 753,648, Aug. 30, 1991, Pat. No. 5,193,583.

[51] Int. Cl.$^5$ .............................................. F16K 47/04
[52] U.S. Cl. .................................. 137/625.32; 251/127
[58] Field of Search ..................... 251/127; 137/625.32

[56] References Cited

U.S. PATENT DOCUMENTS

| | | |
|---|---|---|
| 1,615,564 | 1/1927 | Beery . |
| 3,023,783 | 3/1962 | Vickery . |
| 3,665,965 | 5/1972 | Baumann . |
| 3,826,281 | 7/1974 | Clark . |
| 3,880,191 | 4/1975 | Baumann . |
| 4,085,774 | 4/1978 | Baumann . |
| 4,212,321 | 7/1980 | Hulsey . |
| 4,271,866 | 6/1981 | Bey . |
| 4,295,493 | 10/1981 | Bey . |
| 4,364,415 | 12/1982 | Polon . |
| 4,402,485 | 9/1983 | Fagerlund . |
| 4,479,510 | 10/1984 | Bey . |
| 4,530,375 | 7/1985 | Bey . |
| 4,610,273 | 9/1986 | Bey . |
| 4,691,894 | 9/1987 | Pyotsia et al. . |
| 4,889,163 | 12/1989 | Engelbertsson ............... 251/127 X |
| 5,070,909 | 12/1991 | Davenport ..................... 251/127 X |

FOREIGN PATENT DOCUMENTS

| | | |
|---|---|---|
| 0325846A1 | 8/1989 | European Pat. Off. . |
| 1200688 | 9/1965 | Fed. Rep. of Germany . |
| 2352370A1 | 4/1975 | Fed. Rep. of Germany . |
| 2446025A1 | 4/1975 | Fed. Rep. of Germany . |
| 2359717A1 | 6/1975 | Fed. Rep. of Germany . |
| 7314151 | 4/1975 | Netherlands . |
| 237241 | 4/1945 | Switzerland . |
| 552453 | 5/1977 | U.S.S.R. . |

OTHER PUBLICATIONS

"Soundtrim Modulating Low Noise Control Plug Valve", *Durco Brochure Bulletin V-37*, Jun. 1987.
*NAF-Trimball* (undated).
"Series 61 and 62 High Performance Rotary Valve", *Introl*, undated.
"Anticavitation Rotary Control Valve, Rotrol-Series 61", *InTech*, Sep. 1987.
*Neles Q-Ball®*, "Trim Alternatives", May 1986.
*Neles*, "Control Valves for Gas Transmission and Distribution", Application Data Sheet 5B1, Oct. 1986.
*Neles*, "Control Valves Series R11 and Q-R11", Jan., 1988.
*Neles-Jamesbury*, "Q-Ball® Quiet Metal Seated Rotary Control Valve", Mar. 1989.
*Neles*, "Q-Ball® Valve Applications for Power Plants", Application Data Sheet-7B1, undated.

*Primary Examiner*—Arnold Rosenthal
*Attorney, Agent, or Firm*—Marshall, O'Toole, Gerstein, Murray & Borun

[57] ABSTRACT

A rotary valve noise attenuator with a rotary ball control element and a noise attenuator member mounted in the ball having multiple, elongated, substantially enclosed channels formed across the valve opening to split the flow stream into several smaller flow streams. The channel walls are perforated so each smaller flow stream is further dispersed and diffused into many minute flow streams after entering the channel. A noise attenuator constructed of several corrugated sections fixed crest to crest to form several diamond shaped channels across the valve opening each having four side walls with holes.

5 Claims, 4 Drawing Sheets

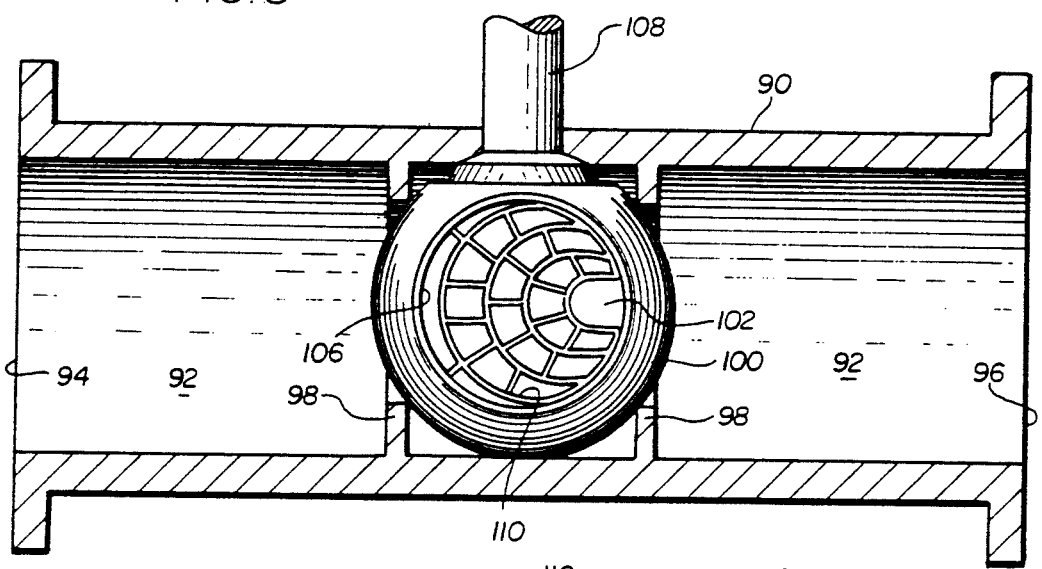
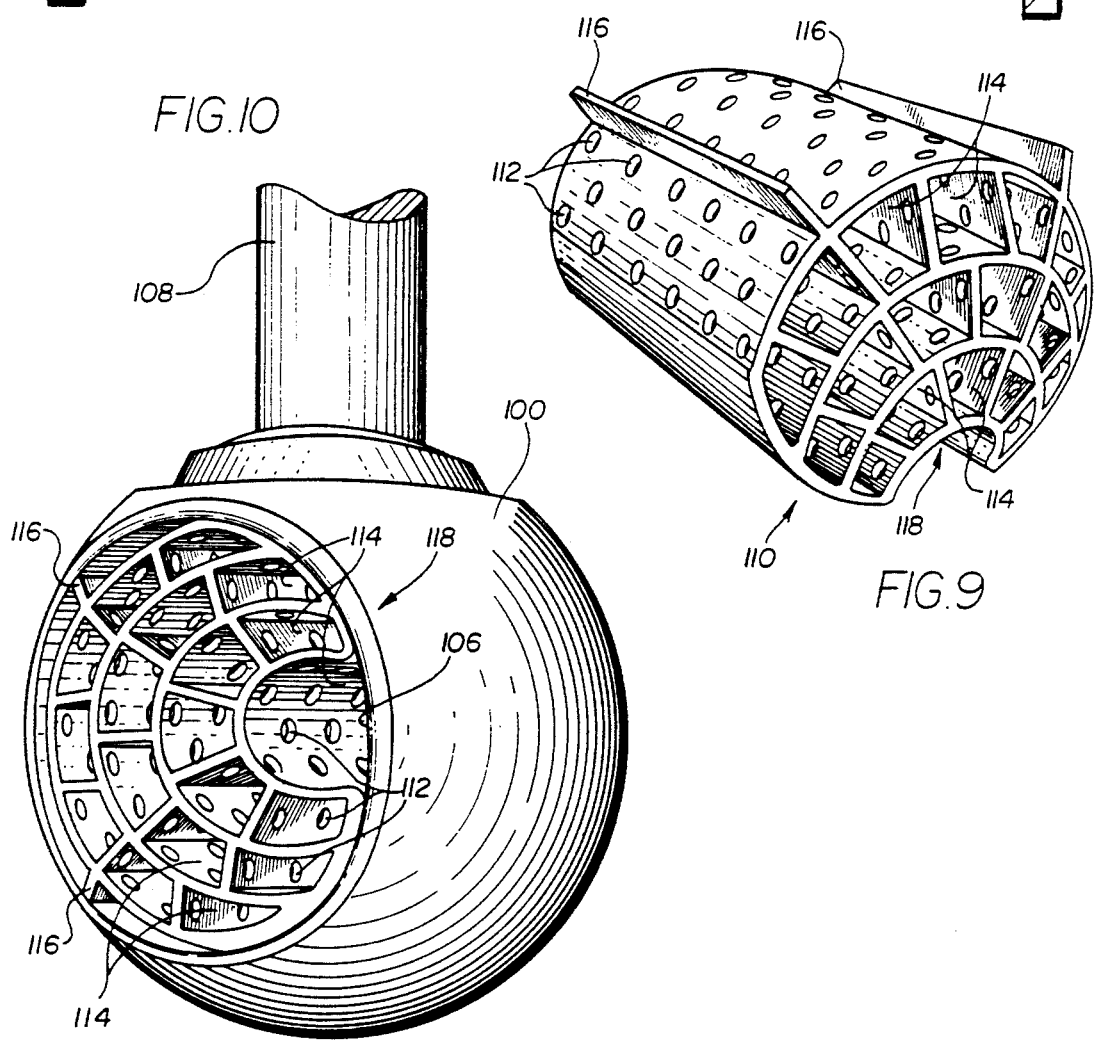

ically available in a conduit adjacent and immediately
ROTARY NOISE ATTENUATOR This is a continuation-in-part of application Ser. No. 07/753,648, filed Aug. 30, 1991, now U.S. Pat. No. 5,193,583.

This invention relates to fluid control valves and more particularly to rotary valve noise attenuator devices for such valves.

BACKGROUND OF THE INVENTION

Devices are commercially available for placement into a fluid stream to reduce noise otherwise resulting from a jet or other highly concentrated fluid stream flowing in a conduit and through standard pipeline components, such as control valves, line connectors, pipeline instrumentation, etc. One example of such a noise attenuator is described in U.S. Pat. No. 4,402,485 (A. Fagerlund), owned by the present assignee. This patent describes a plurality of nested perforated tubes eccentrically arranged and disposed in substantially parallel relationship to each other along the axis longitudinal of the conduit.

Generally, such noise attenuators as shown in the aforementioned patent as well as other proposed structures are located in a conduit adjacent and immediately downstream of a fluid control valve, such as a rotary valve. Thus, the normal fluid noise resulting from the turbulent flow of a jet stream upon initiating opening and closing of the control valve will be attenuated by such noise attenuating devices. More recently, commercial noise attenuator devices have become available in which the noise attenuator is mounted within a rotary control member of the fluid control valve in a combined structure. The combined structure is generally desirable in order to ease the maintenance of such fluid control valves in that removal of the rotary control member simultaneously removes the noise attenuator for servicing or routine maintenance. This combination also is desirable so as to aid in obtaining standard valve flange face to face dimensions for valves with or without a noise attenuator device.

One such commercially available combined rotary control and noise attenuator device utilizes a series of perforated attenuator plates mounted in the bore of a full ball control member or mounted to a segmented ball control member. Generally, such perforated attenuator plates are arranged parallel to each other and are maintained spacially mounted from the ball member by several fasteners perpendicular to the plates. In operation, a concentrated fluid stream immediately encounters a perforated plate across the valve opening and the full incoming stream must pass through the plate perforations as the valve is initially opened to form many minute flow streams due to the perforations.

Certain presently available rotary valve noise attenuator devices utilize many components which are fastened together in a non-secure manner so that occasionally one or more components disengage and are carried downstream of the valve to undesirably interfere with the pipeline system while also obviously degrading the noise attenuator performance.

It is now desired to provide a rotary valve noise attenuator device which is easier and less costly to manufacture yet provides increased noise attenuation compared to presently known proposed or commercial devices. Also, it is desired to provide a reliable operating rotary valve noise attenuator device having improved structural integrity.

SUMMARY OF THE INVENTION

A rotary valve noise attenuator device is provided for fluid control valves. The device includes a rotary ball fluid control member and a noise attenuator member mounted in the ball for rotation therewith to progressively insert the noise attenuator member into the path of fluid during opening of the valve.

In accordance with the principles of the present invention, the noise attenuator member is formed with several elongated channels extending across the entire ball at the valve opening to encounter a flow stream and split it up into several smaller flow streams directed into the channels. Each channel includes channel enclosing side walls transverse to the fluid flow path and it is preferred that the side walls are perforated so that each smaller flow stream is then further dispersed into many minute flow streams through the perforated walls.

In one embodiment of a channel formed noise attenuating device in accordance with the present invention, each channel is formed of a plurality of vertically aligned and oppositely disposed corrugated members welded together at their crests. Combining the corrugated members in this manner forms a plurality of elongated channels each with two side walls provided by one of the corrugated members and the opposite two side walls provided by the other corrugated member.

In this embodiment of the invention, all four walls of each formed elongated channel are arranged transverse to the fluid flow in a diamond shaped configuration. The formed noise attenuator device is then mounted within a segmented ball control member at the ball gap portion to present several diamond shaped channels across the valve opening at the leading V edge of the segmented ball.

Accordingly, as the ball valve is opened, the concentrated fluid flow stream first will be split into several smaller flow streams by the substantially enclosed channels and then each smaller flow stream will gradually transfer from one channel to the next by being further dispersed through the holes in the channel side walls. Therefore, compared to prior known ball control noise attenuators, the present invention provides channel forming members with more effective flow splitting and dispersal. In this embodiment the incoming stream is split by several diamond shaped faces leading the stream to several channels and the split streams are each quickly dispersed and diffused by the four transverse-holed walls of the channel member.

It is desirable to form the walls of the elongated channel in a diamond shaped configuration facing the fluid flow. The diamond shaped configuration places a controlled flow area of the noise attenuator member into the initial flow path so as to enable the initial flow stream to be split up into multiple diffusion paths of fluid flow thereby providing increased effectiveness in noise attenuation.

Other channel forming embodiments of the invention which afford the desired multiple diffusion may be provided. One alternative embodiment uses a plurality of elongated rectangular channel members with perforations. The elongated channels are welded together along common walls and the entire noise attenuator member is mounted to a segmented ball control member. This embodiment operates in substantially the same manner as the preferred embodiment. The alternative embodiment provides a double walled configuration for the elongated channels as compared to the preferred embodiment.

In another alternative embodiment to the invention, the noise attenuation member has channels formed in part using eccentrically nested perforated tubes in the manner of the aforementioned U.S. Pat. No. 4,402,485, and wherein the noise attenuation member is mounted directly onto a segmented ball control element.

A significant advantage of the present invention is that the channel members can be readily formed as previously described and in which vertically aligned corrugated structures are welded together and then with the entire assembly welded into a segmented ball control element to form a combined unit with reliable structural integrity. In a preferred embodiment of the invention, the channel forming members can be formed by casting so that the cast noise attenuator member may then be readily welded directly into the segmented ball to achieve reliable structural integrity.

In a still further embodiment of the invention the channel forming members as previously described can be formed by casting into a cast noise attenuator member with elongated channels, and the formed noise attenuator member is then mounted and welded within a through passageway bore in a full ball control member. The bore extends through the full ball fluid control member with opposite bore inlet and bore outlet ends. The elongated channels extend within the bore and with a plurality of channel front ends extending across substantially the entire bore inlet end.

Thus, opening the ball valve places the bore inlet end into the fluid flow stream so that the concentrated fluid flow stream first will be split into several smaller flow streams by the elongated channels and then each smaller flow stream will transfer from one channel to the next by being further dispersed through the holes in the channel side walls, and finally exit through the channel ends at the bore outlet end of the full ball.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

FIG. 8 is an elevational view partly in section illustrating another embodiment of the invention with a noise attenuator member insertably mounted in a rotary ball fluid control member;

FIG. 9 is a perspective view of the noise attenuator insert member of FIG. 8; and FIG. 10 is a perspective view illustrating the upstream face of the noise attenuator device of FIG. 8.

DETAILED DESCRIPTION

Figure 1:
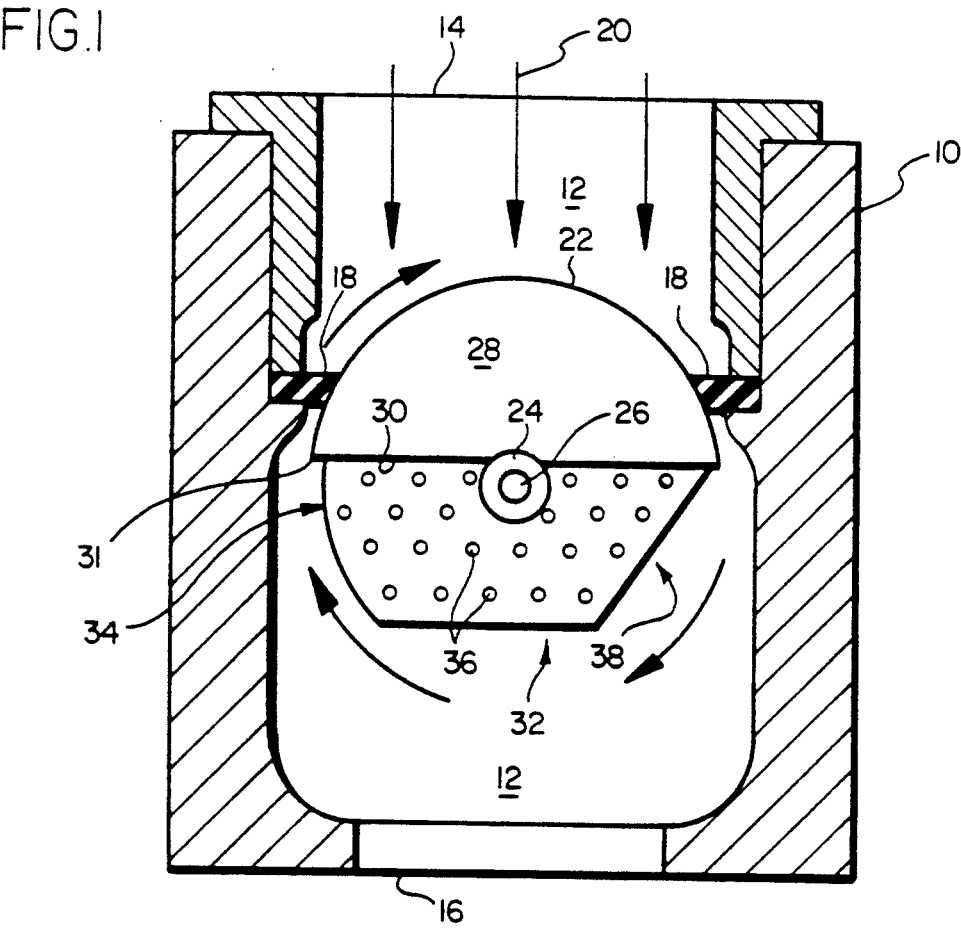
FIG. 1 is a schematic drawing illustrating a rotary noise attenuator device for fluid control valves in accordance with the present invention.
Figure 2:
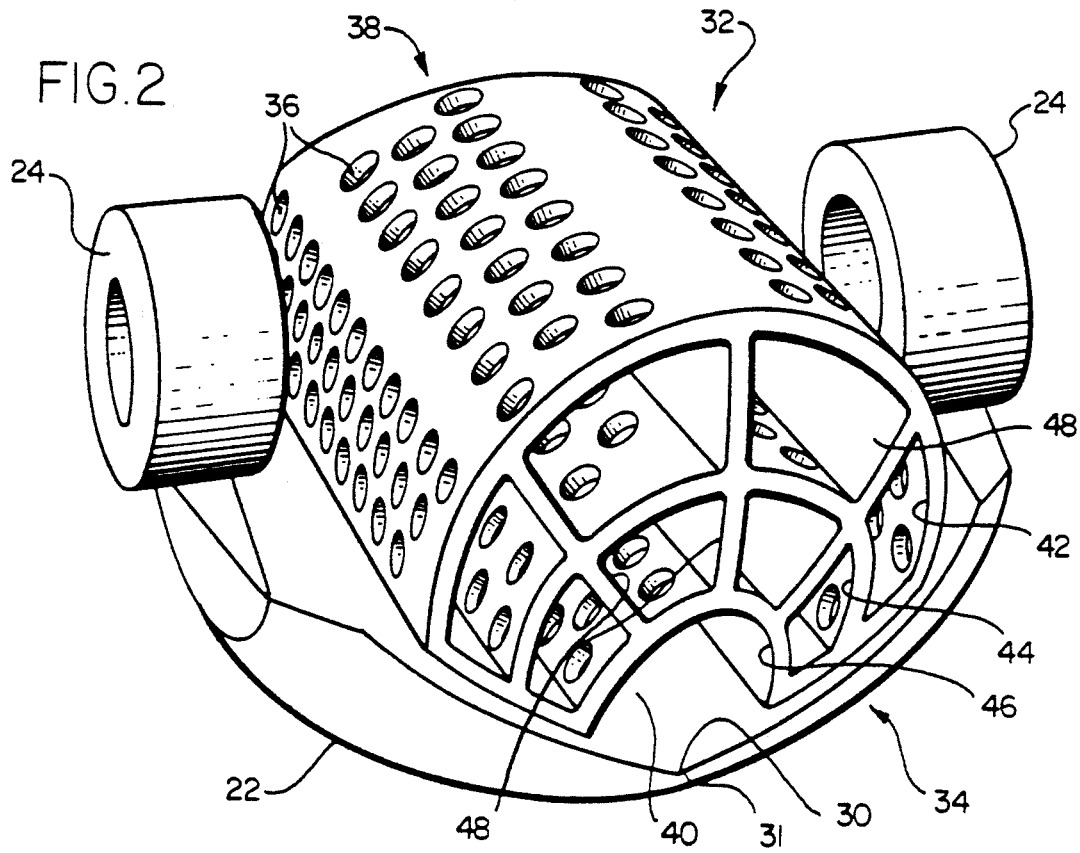
FIG. 2 is a perspective view illustrating a preferred embodiment of a rotary noise attenuator device in accordance with the present invention.
Figure 3:
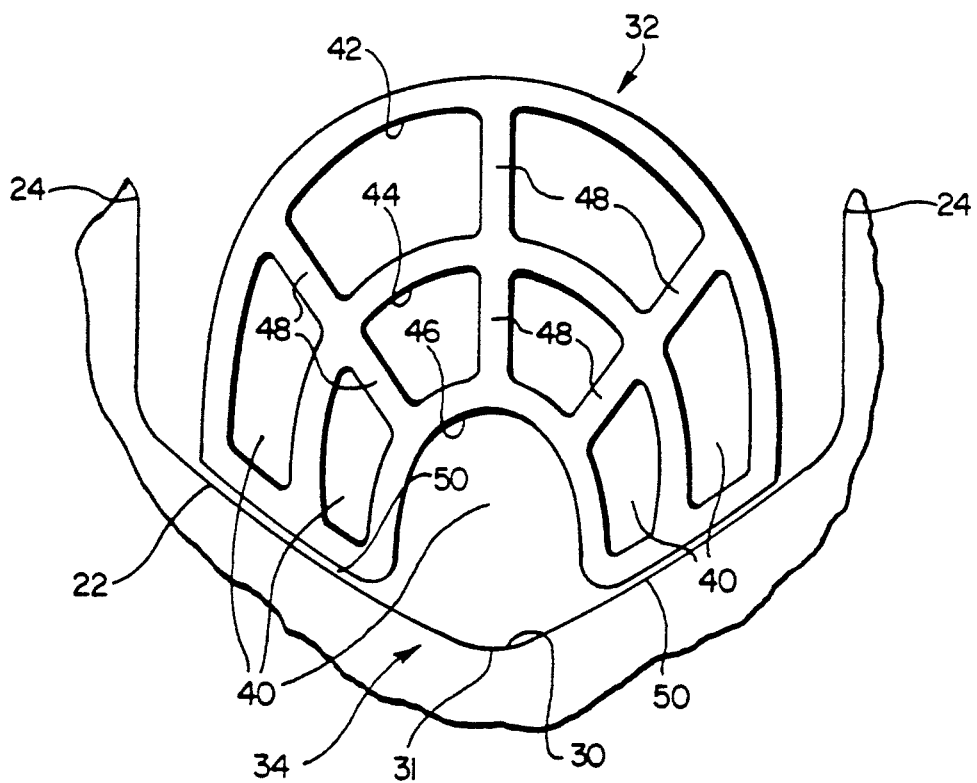
FIG. 3 is a schematic view illustrating the upstream face of the noise attenuator device of FIG. 2.

Referring to FIGS. 1-7 of the drawings, there is illustrated several embodiments of a noise attenuator device with a plurality of elongated, perforated channels mounted within a rotary ball fluid control element. The preferred embodiment of the invention is illustrated in FIGS. 2 and 3 as will be more particularly described hereinafter.

FIG. 1 illustrates a fluid control valve body 10 containing a fluid passageway 12 for conveying fluid from a valve inlet 14 to a valve outlet 16. A sealing element 18 is suitably mounted within passageway 12 and may be formed of resilient material to act as a valve seat. Directional reference arrows 20 represent the flow of fluid through valve inlet 14, into passageway 12 and exiting valve outlet 16 when the valve is in the open condition.

Rotatably mounted within valve body 10 there is provided a rotatable segmented ball 22 which includes opposite ear-shaped portions 24, including a shaft 26 therethrough for rotatably mounting segmented ball 22 in the valve body in a known manner.

Segmented ball 22 further includes a spherically shaped ball sealing portion 28 for contacting sealing element 18 during closing of fluid passageway 12, and an opposite ball gap portion 30 with leading V edge 31 for rotatable insertion into the path of fluid passing through said valve corresponding to selective opening of the valve.

In accordance with the principles of the present invention, there is provided a noise attenuating member 32 mounted in segmented ball 22 at the ball gap portion 30. In the position shown in FIG. 1, the valve is in a closed condition with the ball sealing portion in fluid sealing, seating engagement with the sealing element 18 to prevent fluid at inlet 14 from reaching outlet 16. Rotating shaft 26 in the clockwise direction as shown by the directional reference arrows in FIG. 1, enables an upstream face 34 of the noise attenuator member at ball leading V edge 31 to initially encounter the fluid flow stream and to guide the fluid flow stream through noise attenuator 32 and towards outlet 16.

The noise attenuator member includes a plurality of holes 36 to suitably dissipate the on-rushing fluid stream entering upstream face 34 upon initial opening of the valve. It is desired that when the valve is fully open with upstream face 34 aligned in the direction of fluid directional reference arrows 20, most of the fluid will pass directly through the upstream face and out the downstream face 38 of the noise attenuator member without any significant amount of fluid passing through the holes 36.

As illustrated in FIG. 1, upstream face 34 of noise attenuator member 32 mounted in ball gap portion 30 closely follows the contour of an extension of spherical ball sealing portion 28. At the opposite end of member 32, downstream face 38 has a slanting contour of about 45 degrees, although other contour angles or contour shapes may be utilized so long as the combined ball control and noise attenuator member is able to fit within the dimensional confines of the valve components in passageway 12 and to rotatably operate satisfactorily into and out of seating engagement with the valve seat. It is to be understood that the upstream and downstream faces of all of the embodiments shown in FIGS. 2-7 have surface contours similar to that described above.

In all of the illustrated embodiments herein of various noise attenuator members in accordance with the principles of the present invention, it is desired that the main flow stream or jet is split up into several smaller flow streams during the initial opening of the control valve and the several smaller flow streams are then each dispersed into many minute flow streams. Multiple diffusion paths of the incoming flow stream is thus effectively provided by the present invention.

As soon as upstream face 34, for instance, of noise attenuator 32 encounters the fluid stream upon rotation of the segmented ball 22 during opening of the valve, it has been found desirable to provide the maximum amount of controlled flow area of a noise attenuator, such as noise attenuator 32, into the flow stream so as to split or break the flow into several flow streams. In accordance with the present invention, the noise attenuator members illustrated and described hereinafter not only provide more effective noise attenuation than prior devices, but also are easier and less costly to manufacture as well as more structurally reliable than such prior devices.

In particular, it has been found desirable to provide a plurality of elongated, substantially enclosed perforated channels directly mounted onto ball gap portion 30 and extending across the valve opening to meet all of the objectives described above.

FIG. 2 illustrates, for example, the noise attenuator member 32 of FIG. 1. FIG. 2 shows noise attenuator member 32 in the preferred embodiment formed as a cast unit with machined holes 36. The cast unit contains a plurality of channels 40 formed and defined by the illustrated parallel sections of circular tubes 42, 44, 46 eccentrically mounted within ball gap portion 30 of segmented ball 22 with a plurality of side walls 48. The holes 36 are provided in the sections 42, 44, 46 and need not be provided in side walls 48, unless desired.

FIG. 3 is a schematic illustration of an upstream face 34 of noise attenuator member 32 which extends across the valve opening at ball gap portion 30 and ball leading V edge 31. As can be seen in FIG. 3, the upstream face 34 presents at least five channels 40 immediately encountering the flow stream upon initial opening of the valve so as to split the stream and form at least five smaller flow streams. Holes 36 (not shown in FIG. 3 for convenience of illustration) in each channel then disperse each of the smaller flow streams to diffuse the stream into many minute streams.

Noise attenuator member 32 is welded to ball gap portion 30 at selected respective engaging portions such as 50, so as to be rigidly maintained within segmented ball 22. This provides a unit of reliable structural integrity. Upstream face 34 and downstream face 38 have contours similar to the respective upstream and downstream faces 34, 38 as previously described in connection with FIG. 1.

Figure 4:
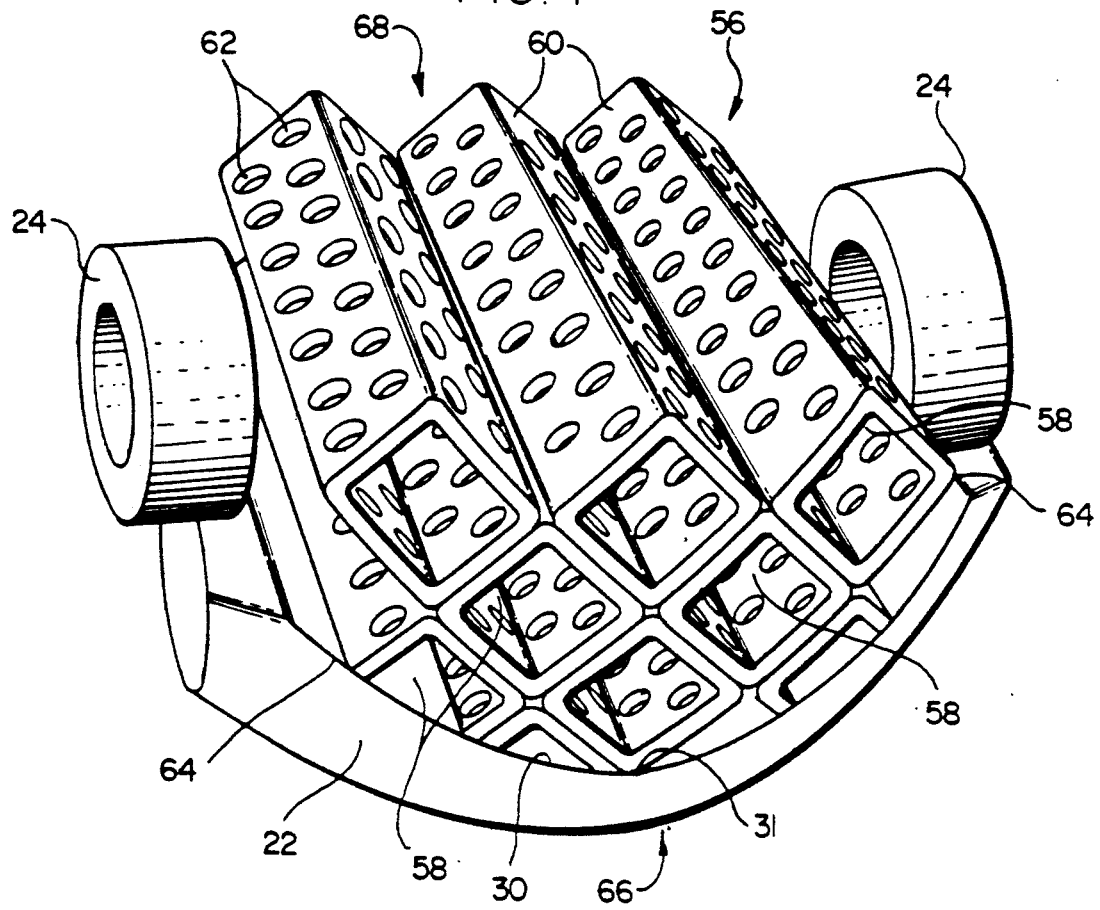
FIG. 4 is a perspective view of another embodiment of the invention.

FIG. 4 illustrates another embodiment of a noise attenuator member 56 mounted within a ball gap portion 30 of a segmented ball 22. In this case, a plurality of channels 58 are formed by a plurality of rectangular perforated tubular members 60 with holes 62. Each of the rectangular tubular members 60 are welded together along adjacent faces as shown in FIG. 4 with the entire noise attenuator member 56 then welded such as at engaging portions 64 (see FIG. 5) so as to mount the attenuator within ball gap portion 30 of segmented ball 22. All of the walls of the rectangular tubular members 60 have holes 62 so that as the valve is initially opened, fluid may readily enter several channels 58 across the valve opening at the ball leading V edge and then pass from one channel to the next via holes 62.

It is understood that upstream face 66 and downstream face 68 may be contoured similarly to that of previously described upstream face 34 and downstream face 38.

Figure 5:
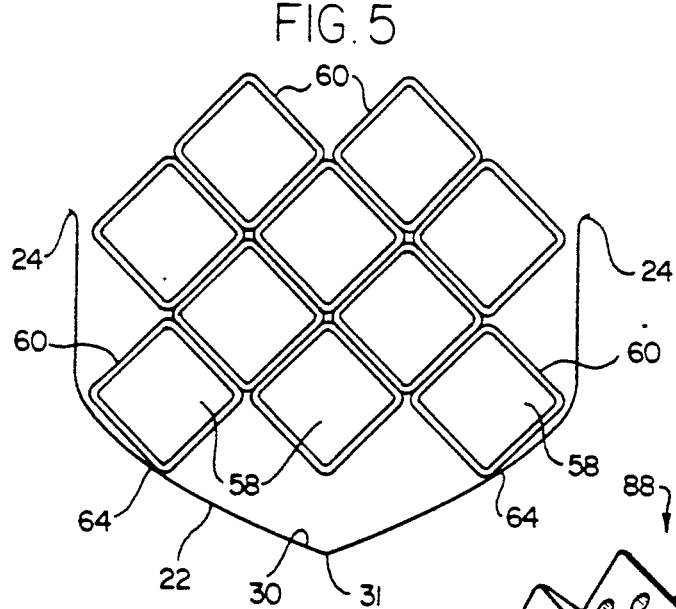
FIG. 5 is a schematic view illustrating the upstream face of a modification of the rotary noise attenuator of FIG. 4.

FIG. 5 illustrates the upstream face of a modified configuration of a noise attenuator 56 wherein more rectangular tubular members 60 have been added than the embodiment of FIG. 4. Again, for illustration convenience, holes 62 are not shown in FIG. 5.

Figure 6:
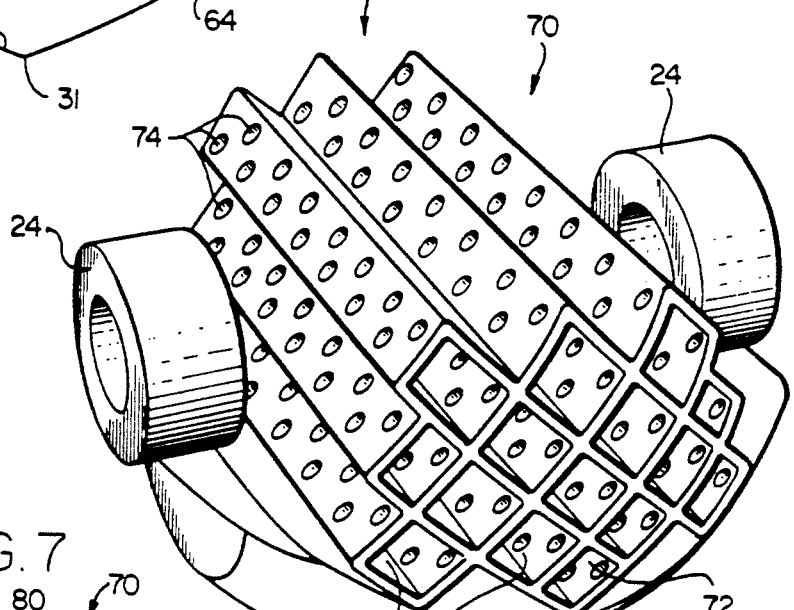
FIG. 6 is a perspective view illustrating another embodiment of the present invention.
Figure 7:
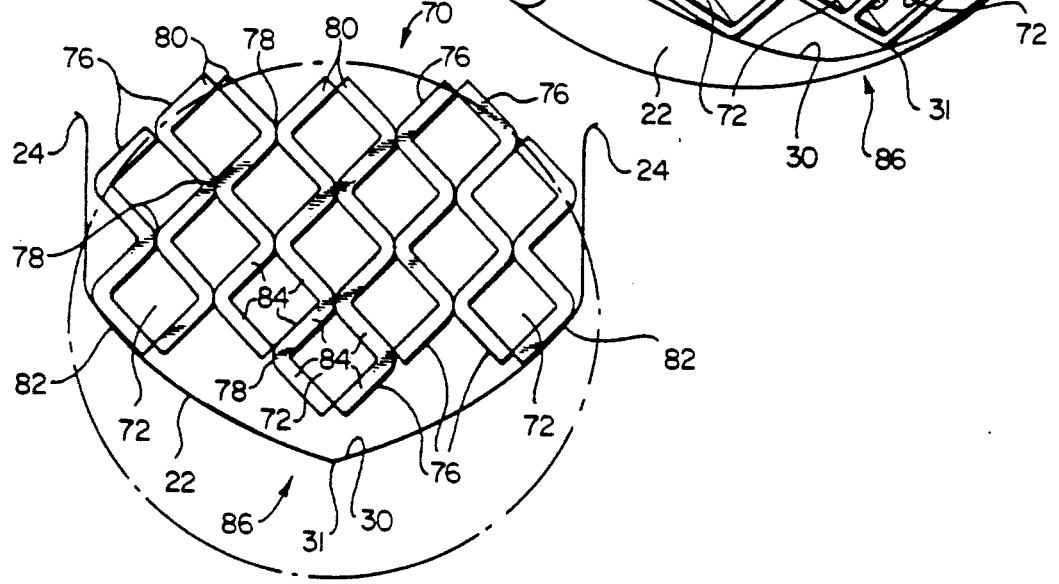
FIG. 7 is a schematic view illustrating a upstream face of the rotary noise attenuator of FIG. 6 and which is helpful in illustrating the manner of constructing this embodiment.

Referring now to FIGS. 6 and 7, there is illustrated another embodiment of the present invention. A noise attenuator member 70 is formed with substantially enclosed channels 72 wherein the walls of each channel contain perforations or holes 74. To illustrate the manner of construction of the noise attenuator member 70 of FIG. 6, reference may be made to the schematic view of FIG. 7 wherein there is shown a plurality of opposing, corrugated sections 76 with crests 78, each of the corrugated sections 76 containing holes 74 (not shown in FIG. 7). As shown in FIG. 7, the respective corrugated sections 76 are placed adjacent each other with crests 78 and ends 80 in contact engagement so that the crests 78 and the ends 80, respectively, are welded together to form the elongated, substantially enclosed, perforated channels 72. The assembled noise attenuator member 70 is then welded into ball gap portion 30 of the segmented ball 22 at ball contact engaging portions 82.

Accordingly, as shown in FIGS. 6 and 7, diamond shaped channels 72 are presented to the fluid flow across the valve opening so that an increased amount of flow control area presented by perforated walls 84 of each channel 72 is presented to the initial flow stream. Notice for instance, in an upstream face 86 of noise attenuator member 70, a plurality of diamond shaped channels are presented to encounter the flow stream as the valve is opened, and each diamond shaped channel 72 presents four transverse holed walls 84 to the initial jet stream at the ball leading V edge so that the main stream is first split into multiple paths along respective channels and then each split flow stream is dispersed and diffused into many minute streams by the holes 72 in the walls 84 to thereby obtain very efficient noise attenuation. Upstream face 86 and downstream face 88 have contours similar to the respective upstream and downstream faces 34, 38 as described in connection with FIG. 1.

In a constructed prototype of the embodiment as shown in FIGS. 6 and 7, the following dimensions were used:

(1) Length of each channel 72—5.25 in. (13.34 cm)
(2) Cross section of each channel—0.625 in. ×0.625 in. (1.59 cm×1.59 cm)
(3) Overall width of assembled channels—4.25 in. (10.8 cm)
(4) Overall length of assembled channels—5.75 in. (14.61 cm)

Preliminary test results on this constructed prototype exhibited up to a 10 db sound pressure level reduction over a wide range of pressures and flow conditions.

To effectively obtain more channels across the valve opening, sawtooth or other contoured cuts may be made on the upstream faces of the channels to enable the incoming flow stream to enter more channels and thereby desirably split the stream into more smaller flow streams before being further dispersed by the holed walls.

Referring now to FIGS. 8-10, there is illustrated another embodiment of the invention wherein the previously described noise attenuator member is inserted into a full ball fluid control member. As illustrated in FIG. 8, a fluid control valve body 90 contains a fluid passageway 92 for conveying fluid from a valve inlet 94 to a valve outlet 96. Suitable sealing elements 98 act as the valve seat. A rotatable full ball 100 includes a through passageway bore 102 extending from a bore inlet end 106 to an opposite bore outlet end. The shaft 108 is connected to ball 100 for controllably rotating the ball within the valve body. Within bore 102 there is mounted a noise attenuating member 110 having elongated, perforated side wall channels and constructed similar to previously described noise attenuating member 32 shown in FIGS. 2 and 3.

FIG. 9 illustrates noise attenuator member 110 as a cast unit with machined holes 112. The cast unit contains a plurality of channels 114 formed and defined by channel side walls as shown in the illustrated cast unit of FIG. 9. It is preferred that the holes 112 are provided in all of the channel 114 side walls as illustrated.

Noise attenuator member 110 includes at least two outwardly extending wing members 116 to assist in rigidly mounting member 110 within full ball bore 102. As shown in FIG. 10, noise attenuator member 110 is inserted into bore 102 with the longitudinally extending channels 114 extending along the bore. This desirably presents a plurality of channels 114 at an upstream face 118. As can be seen from FIG. 10, the upstream face 118 presents several channels 114 immediately encountering the flow stream upon initial opening of the valve so as to split the stream and form several smaller flow streams. Holes 112 in each channel 114 then disperse each of the smaller flow streams to diffuse the stream to many minute streams.

Noise attenuator member 110 is welded to full ball 100 at respective engaging portions and particularly at wings 116. This provides a unit of reliable structural integrity.

The foregoing detailed description has been given for clearness of understanding only, and no unnecessary limitations should be understood therefrom, as modifications will be obvious to those skilled in the art.

What is claimed is:

1. A rotary valve noise attenuator device for fluid valves having a passageway for communicating a fluid flow stream through said valve, and a sealing member in said passageway, said rotary valve noise attenuator device comprising:

a rotary ball fluid control member for rotatable mounting in said passageway adjacent said sealing member to control the flow stream through said passageway, said rotary ball fluid control member comprising a full ball having a ball sealing portion sealingly engageable with said sealing member corresponding to closing of said valve, and a bore extending through said full ball with opposite bore inlet and bore outlet ends for selective insertion of said bore inlet end into the flow stream corresponding to selective opening of said valve;

a noise attenuator member mounted in said bore for rotation therewith to progressively insert said noise attenuator member into the flow stream during opening of said valve, said noise attenuator member formed with a plurality of elongated, perforated channels extending across substantially said entire bore inlet end and said sealing member during opening of said valve, each channel having a front end and a rear end with a longitudinal axis extending through said front and rear ends and each channel formed with four side walls having perforations;

said plurality of channels disposed and maintained in said bore with each of said longitudinal axes being parallel to each other and with said channel front ends rotatable into the flow stream during opening of said valve for initially receiving said flow stream;

said channel front ends splitting said flow stream into several respective smaller flow streams and guiding said respective smaller flow streams into respective channels, and said smaller flow streams being dispersed through said perforated channels.

2. A rotary valve noise attenuator device according to claim 1, wherein said noise attenuator member is formed as a cast unit.

3. A rotary fluid valve with a noise attenuator for fluid flow streams comprising:

a valve body with a passageway therethrough for accommodating said fluid flow stream;

fluid sealing means in said passageway;

a rotary ball fluid control member rotatably mounted in said valve body passageway adjacent said fluid sealing means to control the flow stream through said passageway, said rotary ball fluid control member comprising a full ball having a ball sealing portion sealingly engageable with said fluid sealing means corresponding to closing of said valve, and a bore extending through said full ball with opposite bore inlet and bore outlet ends for selective insertion into the flow streams corresponding to selective opening of said valve;

a noise attenuator member having opposite upstream and downstream faces and mounted in said bore with said upstream face at said bore inlet end for rotation with said full ball to progressively insert said noise attenuator member into the flow stream during operation of said valve, said noise attenuator member formed with a plurality of elongated channels each formed with four channel enclosing side walls, at least two of said channel enclosing side walls having perforations, said elongated channels extending across substantially said entire bore inlet end, each channel including a front end and a rear end with a longitudinal axis extending through said front and rear ends;

means for mounting said plurality of elongated channels in said bore with each of said longitudinal axes being parallel to each other and with said channel front ends defining said upstream face and rotatable into the flow stream during opening of said valve for initially receiving said flow stream;

said channel front ends splitting said flow stream into several respective smaller flow streams and guiding said respective smaller flow streams into respective channels, and said smaller flow streams being diffused through said perforated channel enclosing side walls.

4. A rotary fluid valve according to claim 3, wherein said noise attenuator member is formed as a cast unit.

5. A rotary valve noise attenuator device for fluid valves having a passageway for communicating a fluid flow stream through said valve, and a sealing member in said passageway, said rotary valve noise attenuator device comprising:

a rotary ball fluid control member for rotatable mounting in said passageway adjacent said sealing member to control the flow stream through said passageway, said rotary ball fluid control member comprising a full ball having a ball sealing portion sealingly engageable with said sealing member corresponding to closing of said valve, and a bore extending through said full ball with opposite bore inlet and bore outlet ends for selective insertion of said bore inlet end into the flow stream corresponding to selective opening of said valve;

a noise attenuator member mounted in said bore for rotation therewith to progressively insert said noise attenuator member into the flow stream during opening of said valve, said noise attenuator member formed with a plurality of elongated, perforated channels extending across substantially said entire bore inlet end and said sealing member during opening of said valve, each channel having a front end and a rear end with a longitudinal axis extending through said front and rear ends and each channel formed with four side walls, at least two of said side walls having perforations;

said plurality of channels disposed and maintained in said bore with each of said longitudinal axes being parallel to each other and with said channel front ends rotatable into the flow stream during opening of said valve for initially receiving said flow stream;

said channel front ends splitting said flow stream into several respective smaller flow streams and guiding said respective smaller flow streams into respective channels, and said smaller flow streams being dispersed through said perforated channels.

* * * * *